UNITED STATES PATENT OFFICE 2,315,201

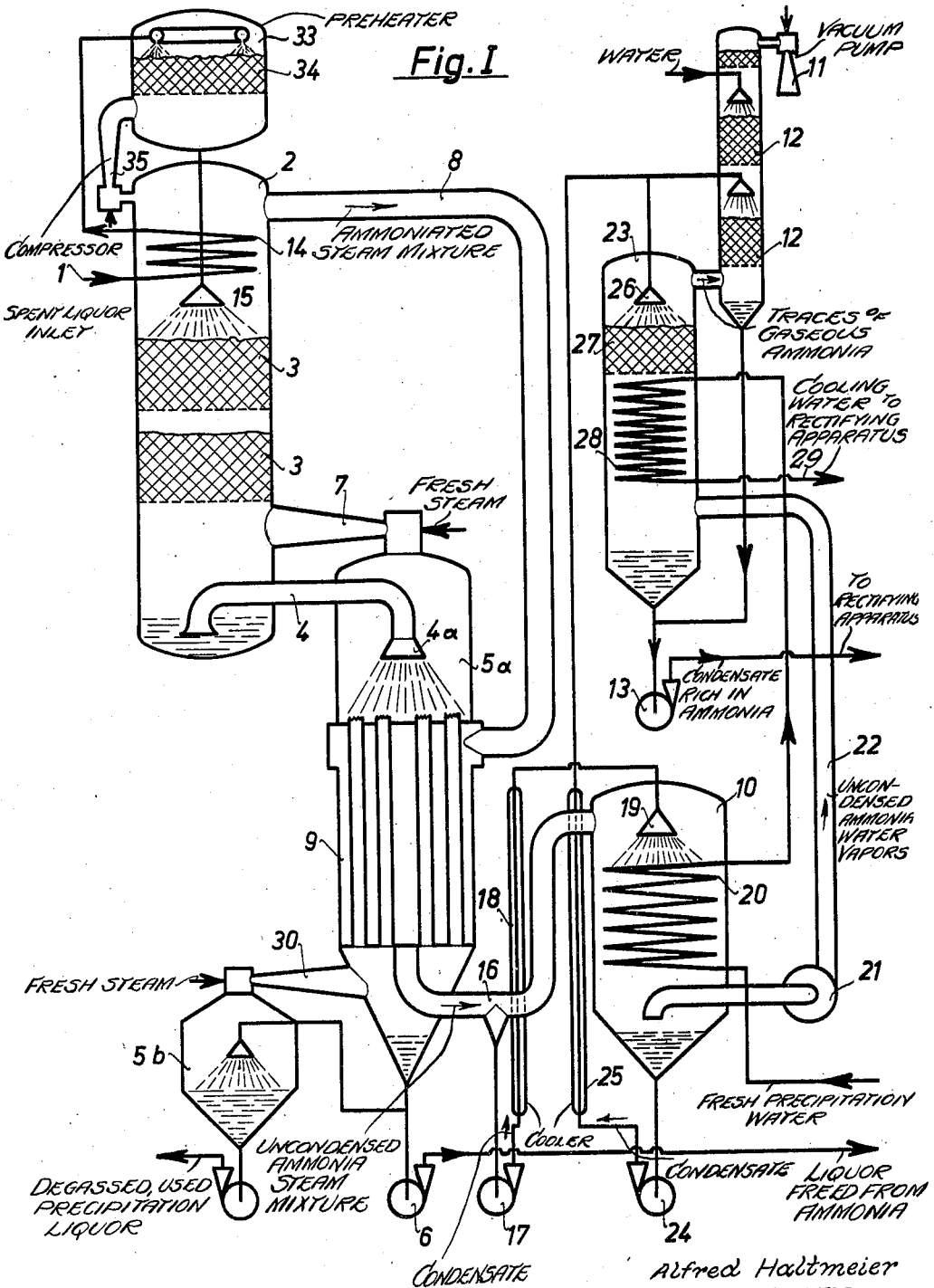

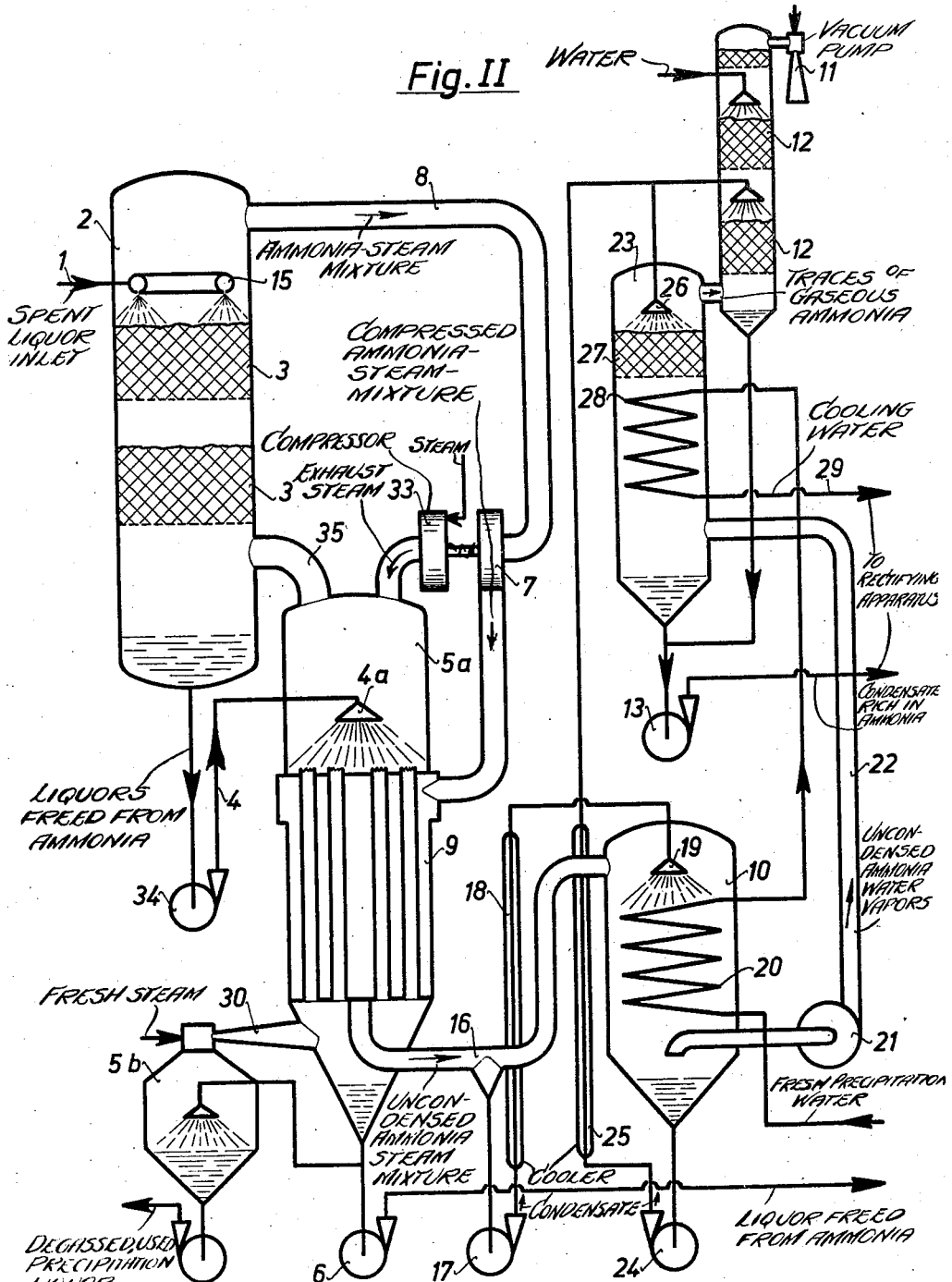

RECOVERING AMMONIA FROM USED CU-PRAMMONIUM ARTIFICIAL SILK PRECIPITATION LIQUORS

Alfred Haltmeier, Bergisch-Gladbach, Germany; vested in the Alien Property Custodian Application April 16, 1940, Serial No. 329,908
In Germany May 4, 1939

5 Claims. (Cl. 23—193)

The present invention relates to a process of recovering ammonia and heat values from spent precipitation liquors obtained in the manufacture of artificial fibers from cuprammonium cellulose solutions. In the customary processes of spinning cuprammonium cellulose solutions such liquors are obtained in large quantities containing ammonia in concentrations of about 0.1 to 2 g. per liter and heat values corresponding to a temperature of about 25 to 60° C. In order to increase the economy of such spinning processes various proposals have been made for the recovery of the said ammonia and heat values. In my own U. S. Patent No. 2,184,923, I have described a method by which such recovery is effected in a very simple and economical manner. The process of my prior specification comprises, in its more general aspect, bringing the warm precipitation liquors into counter-current contact with a current of steam having a pressure corresponding substantially to the pressure of saturated steam at a temperature equal to the temperature of the liquors, at least a part of said steam being obtained by evaporation of the still warm precipitation liquors after the counter-current treatment at a pressure lower than that of said steam employed for the counter-current treatment of said precipitation liquors, and compressing said part of steam to the pressure employed for the counter-current treatment, introducing said compressed steam into the counter-current apparatus and removing the ammonia and the steam carrying the ammonia and condensing the ammonia and the steam together. The condensation of the ammonia and the steam carrying the ammonia, according to my prior specification, was effected by cooling the ammonia/steam mixture with fresh water to be used in the precipitation of the cuprammonium artificial fibers.

I have now found that, instead of removing the ammonia/steam mixture from the counter-current system and condensing the mixture separately by means of fresh water, it is preferable to condense at least part of the ammonia/steam mixture by cooling with the spent liquors coming from the counter-current apparatus, whereby from the said liquors fresh steam poor in ammonia is generated which is reintroduced into the counter-current apparatus. The rest of the ammonia/steam mixture which is not condensed at this stage may be separately condensed, for instance in the manner described in my prior specification. This improvement of my process has various advantages, especially in that the energy losses are minimized. The heat content of the steam/ammonia mixture coming from the counter-current apparatus is partially transferred, by indirect heat exchange with the liquors leaving the counter-current apparatus poor in ammonia, to the fresh steam which reenters the counter-current apparatus, so that it is always circulated in the system. The only energy which is to be supplied in order to maintain the circulation in the system is the energy necessary for establishing a pressure difference which will allow to effect the condensation of the ammonia/steam mixture and, simultaneously, the vaporization of the liquors. This pressure difference may either be established by compressing the steam generated from the liquors before introducing it into the counter-current apparatus, or by compressing the steam/ammonia mixture before condensing it.

In accordance with the foregoing explanations, the improved process for which I seek protection by Letters Patent may be broadly described as follows: In order to recover as simply and economically as possible the ammonia and heat values contained in the spent precipitation liquors of the manufacture of artificial silk from cuprammonium cellulose solutions, I bring said warm liquors in a counter-current apparatus into direct counter-current contact with steam, the said steam being at least partly generated by partial evaporation of the liquors coming from the counter-current apparatus in a heat exchanger in which they are in indirect contact with at least part of the ammonia/steam mixture coming from the counter-current apparatus. More especially, in one modification of my invention, the warm liquors which in the said counter-current apparatus have been freed from the greater part of the ammonia values, are conducted to a chamber of lower pressure, thereby causing a certain amount of the liquors to evaporate, and are thereupon brought into indirect contact, in a heat exchanger, with the steam/ammonia mixture of higher pressure coming from the counter-current apparatus, whereby a further portion of said liquors is transformed into steam which is compressed to about the pressure existing in the counter-current apparatus and is reintroduced into the said apparatus. On the other hand, part of the ammonia/steam mixture is immediately condensed in the heat exchanger, and the rest may be condensed thereafter, for instance by cooling with fresh precipitation water.

Compression of the steam generated in the heat exchanger, before it enters the counter-current apparatus, may be effected in various ways. I have found, however, that it is advantageous to use, for the said purpose, a steam jet compressor, the driving steam of which adds itself to the steam fed to the counter-current apparatus.

In another modification of my invention, I do not compress the steam which is to be introduced into the counter-current apparatus, but I compress the ammonia/steam mixture coming from the said apparatus before it enters the heat exchanger. Principally, any type of compressor may be used for the said purpose; but preferably I use a rotating compressor being driven by a steam turbine. In this case, the low pressure steam leaving the driving turbine of the compressor may be added to the steam generated in the heat exchanger and directly fed to the counter-current apparatus.

I may add that in many cases, especially if the copper content of the spent liquors is high, it may be advantageous to free the liquors from the copper, for instance by means of a base-exchanger, before subjecting them to the process of my present invention.

The process of my invention is furthermore illustrated by the appended figures, of which the following description may be given:

Figure I

The spent liquors which preferably are freed from copper ions, for instance by means of a base exchanger, enter the system through the pipe 1. They pass through the coil 14 and the preheater 33 in which they are brought first into indirect and thereupon into direct contact with part of the ammonia/steam mixture coming from the counter-current apparatus 2. The said part of the ammonia/steam mixture has been brought to somewhat higher temperature and pressure by means of the compressor 35; thereby, the liquors trickling through the filling material 34 are warmed to the temperature existing in the counter-current apparatus.

The liquors thereupon enter the counter-current apparatus through the distributor 15, whereby they are distributed over the filling material 3. The greater part of the ammonia values contained in the liquors is transferred to the steam flowing in counter-current through the filling material.

The ammonia/steam mixture thus formed is passed through the pipe 8 to the heat exchanger 9 in which it is brought into indirect contact with the liquors leaving the counter-current apparatus through the pipe 4 and entering the chamber 5a through the distributor 4a, whereby it is partially condensed. On the other hand, a certain amount of steam is generated from the liquors which, from the chamber 5a, is reintroduced into the counter-current apparatus by means of the compressor 7. The said compressor may preferably be of the steam-jet type, the driving steam being fed to the counter-current apparatus together with the steam coming from the heat exchanger.

The further treatment of the ammonia/steam mixture which is partly condensed in the heat exchanger may be effected as follows: The condensate is pumped by means of the pump 17 through the double tube cooler 18, which is cooled by water or brine, into the cooler 10 into which the uncondensed portions of the ammonia/steam mixture from the heat exchanger are also fed through the pipe 16. By the distributor 19, the cooled condensate is distributed over the coil 20 through which relatively cold fresh precipitation water is passed. The ammonia and water vapors which are not condensed in the cooler 19 are pumped by the compressor 21, which is preferably driven by electricity, into a similar cooler 23 through the pipe 22. The condensate of the cooler 10 is also passed to the cooler 23 through the double tube cooler 25 by means of the pump 24 and distributed by the nozzle 26. The cooler 23 contains filling material 27 and a coil 28 through which the fresh cooling water coming from the cooler 10 is passed.

The cooling water is then lead by the pipe 29 to a rectifying apparatus (not shown), where it takes up further heat values and, after admixture of precipitation liquor freed from copper and ammonia, may then be used for spinning new quantities of artificial fibers. Any traces of gaseous ammonia still remaining in the cooler 23 are absorbed by means of the filling material 12 which is sprayed with water or the condensate from the cooler 10. The condensate being rich in ammonia coming from 23 is fed to the above mentioned rectifying apparatus (not shown), in which further concentration of ammonia takes place. 11 is the vacuum pump which maintains the vacuum throughout the system.

There remains the liquor being freed from ammonia which accumulates in the lower part of the heat exchanger 9. It is pumped off by means of the pump 6 and may be used together with the fresh water warmed in the coils 20 and 28 and in the rectifying apparatus for precipitating new quantities of artificial fibers. If, for certain purposes, it is desirable to have precipitation water of relatively high temperature, part of the liquors accumulating in the lower part of the counter-current apparatus may also be added or be directly used for precipitating. The heat content of those portions of the spent precipitation liquors freed from ammonia which cannot be reused in the precipitating process may be recovered by spraying them, for instance, into the evaporator 5b, compressing the steam so generated by means of the compressor 30 and reintroducing it into the lower part of the heat exchanger 9.

Figure II

A further embodiment of my invention is shown in Figure II. This figure relates to the modification in which the ammonia/steam mixture coming from the counter-curent apparatus is compressed by means of a rotating compressor 7, preferably an axial flow compressor, which is driven by a steam turbine 33. The compressed ammonia/steam mixture is passed to the heat exchanger, whereas the low pressure steam from the turbine is directly introduced into the chamber 5a where it mixes with the steam generated from the liquors in the heat exchanger and is directly introduced into the counter-current apparatus. The warm liquors coming from the spinning apparatus are introduced into the counter-current apparatus through the pipe 1 by means of the nozzles 15. The liquors having been freed from ammonia in the counter-current apparatus are pumped by the pump 34 through the pipe 4 and distributor 4a into the heat exchanger. Otherwise the meaning of the numbers is the same as in Figure I.

Having described and illustrated my invention and the way in which it is to be performed, what I claim is:

1. In the process of recovering ammonia and heat values from the spent precipitation liquors of the manufacture of artificial fibers from cuprammonium cellulose solutions, the improvement which comprises bringing the warm liquors in a counter-current apparatus into direct counter-current contact with steam thereby expelling the bulk of the ammonia from the liquors as an ammonia/steam mixture, at least part of the steam supplied to the counter-current apparatus being generated by partial evaporation of the liquors coming from the counter-current apparatus in a heat exchanger in which they are in indirect heat exchange relationship with at least part of the ammonia/steam mixture coming from the counter-current apparatus energy being supplied to the system by compressing one of the vapors generated in at least one portion of the system, said vapors being selected from the class consisting of steam and ammonia-steam mixtures.

2. In the process of recovering ammonia and heat values from the spent precipitation liquors of the manufacture of artificial fibers from cuprammonium cellulose solutions, the improvement which comprises bringing the warm liquors in a counter-current apparatus into direct counter-current contact with steam, whereby the greater part of the ammonia is removed from the liquors as an ammonia/steam mixture, conducting the de-ammoniated liquors into a chamber of lower pressure, whereby they are partly evaporated, and thereupon bringing them into indirect heat exchanging relationship, with said ammonia/steam mixture whereby a further portion of said liquors is transformed into steam which together with the steam previously formed is compressed to about the pressure existing in the counter-current apparatus and is fed to the said apparatus.

3. In the process of recovering ammonia and heat values from the spent precipitation liquors of the manufacture of artificial fibers from cuprammonium cellulose solutions, the improvement which comprises bringing the warm liquors in a counter-current apparatus into direct counter-current contact with steam, whereby the greater part of the ammonia is removed from the liquors as an ammonia/steam mixture, conducting the de-ammoniated liquors into a chamber of lower pressure, whereby they are partly evaporated, and thereupon bringing them into indirect heat exchanging relationship, with the said ammonia/steam mixture whereby a further portion of said liquors is transformed into steam which, together with the steam previously formed, is compressed and fed to the counter-current apparatus by means of steam jets.

4. In the process of recovering ammonia and heat values from the spent precipitation liquors of the manufacture of artificial fibers from cuprammonium cellulose solutions, the improvement which comprises bringing the warm liquors in a counter-current apparatus into direct counter-current contact with steam, whereby the greater part of the ammonia is removed from the liquors as an ammonia/steam mixture, compressing at least part of the ammonia/steam mixture coming from the counter-current apparatus, bringing said compressed mixture in indirect heat exchanging relationship with the liquors freed from ammonia which are withdrawn from the counter-current apparatus, whereby part of said liquors is transformed into steam which is reintroduced into the counter-current apparatus.

5. In the process of recovering ammonia and heat values from the spent precipitation liquors of the manufacture of artificial fibers from cuprammonium cellulose solutions, the improvement which comprises bringing the warm liquors in a counter-current apparatus into direct counter-current contact with steam, whereby the greater part of the ammonia is removed from the liquors as an ammonia/steam mixture, compressing the ammonia/steam mixture coming from the counter-current apparatus by means of a rotating compressor driven by a steam turbine, bringing said compressed mixture in indirect heat exchanging relationship with the liquors freed from ammonia which are withdrawn from the counter-current apparatus, whereby part of said liquors is transformed into steam which is reintroduced into the counter-current apparatus together with the low pressure steam of the said steam turbine.

ALFRED HALTMEIER.